United States Patent [19]

Vogel

[11] Patent Number: 4,632,452
[45] Date of Patent: Dec. 30, 1986

[54] TWO-ABREAST PASSENGER SEAT

[75] Inventor: Ignaz Vogel, Karlsruhe, Fed. Rep. of Germany

[73] Assignee: Ignaz Vogel GmbH & Co. KG, Karlsruhe, Fed. Rep. of Germany

[21] Appl. No.: 748,867

[22] Filed: Jun. 26, 1985

[51] Int. Cl.[4] .............................................. A47C 15/00
[52] U.S. Cl. .................................... 297/232; 297/378; 297/411
[58] Field of Search ................ 297/232, 378, 379, 113

[56] References Cited

U.S. PATENT DOCUMENTS

| 2,249,849 | 7/1941 | Owler | 297/113 X |
|---|---|---|---|
| 2,673,593 | 3/1954 | Hendrickson | 297/378 X |
| 2,674,300 | 4/1954 | Liljengren et al. | 297/379 X |
| 3,140,896 | 7/1964 | Babbs | 297/378 X |
| 3,145,051 | 8/1964 | Rausch | 297/378 X |
| 3,797,887 | 3/1974 | Barecki et al. | 297/232 X |
| 3,910,632 | 10/1975 | Marechal | 297/232 |
| 4,099,780 | 7/1978 | Schmidhuber | 297/232 X |
| 4,489,978 | 12/1984 | Brennan | 297/232 |

FOREIGN PATENT DOCUMENTS 0017388 10/1980 European Pat. Off. ............ 297/232

Primary Examiner—Francis K. Zugel

[57] ABSTRACT

A passenger seat constructed of rectangular tube sections, which is stiffened by a beam disposed at the intersection of the seat backs with the seat, which beam consists of a rear frame piece connected to the rear frame structure and having upwardly pointing joint supports, which in turn are firmly located by stiffening rods. The lower ends of the seat back side frame members are reinforced by stiffening members mounted to their front side and at the same time forming lugs for pivotally supporting the seat backs on the joint supports, so as to provide for lowest possible weight together with the necessary strength.

5 Claims, 3 Drawing Figures

TWO-ABREAST PASSENGER SEAT

BACKGROUND OF THE INVENTION

The invention pertains to a two-abreast passenger seat for use in land, sea and air vehicles, comprising a seat frame which can accommodate seat cushions and to which are pivotably linked two seat backs consisting of a rectangular frame with a cushion overlay, and a support structure supporting the seat.

The use value of a passenger seat is affected by many different and sometimes contradictory factors. Passenger seats should be provided with a strength that enables them to protect the passengers in case of an accident, that is, in particular, to take up and absorb the impact energy of persons who collide with the passenger seat. Previously, relatively heavy designs were used in order to obtain such a strength. The large weight of these designs, which always is dead weight, has prevented the economical application of such passenger seats. In order to minimize injuries during an accident, such passenger seats must also be constructed splinterproof, have no edges which could cause wounds, and they must not obstruct the fast evacuation of the vehicle. Aside from these requirements, the passenger seats should also exhibit a long service life which, allowing for the replacement of any parts subject to wear, should correspond to that of the vehicle. A particular requirement is that both occupied and unoccupied passenger seats should be rattle free. In addition, the passenger seats and the area surrounding them should be easy to clean. Finally, the passenger seats should be attractive and very comfortable. All of these requirements should also be economically realizable.

The principal consideration in the fulfillment of the requirements is, however, always the weight of the passenger seats. The basic requirement for the construction of the seats is a design capable of satisfying both the strength and the other requirements determined above while maintaining a low weight.

SUMMARY OF THE INVENTION

This is achieved in accordance with the invention in that the seat frame is of rectangular tubes whose cross-section has greater height than width and which are joined to form a rectangular frame, which is stiffened by at least one central cross tube. There are attached to the rear frame tube at an upward angle of approximately 45° joint supports which are firmly connected by means of a stiffening rod to which the seat backs are linked, and a reinforcement tube is included in each of the rectangular frames of the seat backs in the area near the ends of the joint supports.

A design of the type described allows a departure from the well-known standard version of this type of passenger seat, which arrives at stiffness and strength by means of thick-walled steel tubes. Rather, the stiffness of the entire assembly is achieved according to the invention in that with the aid of the rear frame tube of the rectangular frame, the stiffening rods connecting the joint supports, and the reinforcement tubes included in the rectangular frame, a beam structure is formed capable not only of supporting the entire assembly, but also of taking up and absorbing the large forces associated with an accident. The beam structure is capable of withstanding not only forces acting parallel to the rectangular frame, but also forces perpendicular thereto acting on the passenger seat, that is, it will withstand, for example, forces that occur through passengers colliding with the seat as well as forces that may result from large loads in combination with strong vibrations. It is thereby possible not only to construct, with the aid of the described structural pieces, a passenger seat which is relatively light but also to provide only one central support as supporting structure. The usually necessary support means at the frame ends of the passenger seat are no longer necessary, providing for substantial economical advantages, especially facilitating the cleaning of the floor underneath the passenger seat.

The basic design features of the beam structure include the rear frame tube of the rectangular frame, together with the joint supports and the stiffening rods connecting these joint supports. The reinforcement tubes inside the rectangular frame have only additional strengthening functions, the reinforcement tubes can be mounted to the rectangular frame up to approximately the length of the joint supports above and/or below them. It is recommended that the inner joint supports be firmly connected with one another through both a cross member and a crossbar provided to receive the joint bolts, for further stiffening and especially to attain a greater torsional stiffness.

In order to attain the spacing necessary for the beam between the stiffening rods and reinforcement tubes, the seat backs should, according to the invention, be linked to the joint supports through forwardly projecting mounting lugs. The mounting lugs may also serve to stiffen the rectangular frame in that they extend up to the reinforcement tubes in the rectangular frame.

The rectangular frames are also formed from tubes of oblong cross-section disposed with their narrow sides on top and bottom. This arrangement follows from the consideration that in the case of an accident the forces acting parallel to the seat surface are significantly larger than forces perpendicular thereto.

For further stiffening, as well as to avoid the possibility of injury, it is recommended that the back side of the seat back be covered by a convex plastic shell having stiffening corrugations and surrounding the rectangular frame. This plastic shell can also extend above the rectangular frame and as a result form a supporting structure for a headrest mounted above the seat back.

The symmetrical arrangement of a passenger seat according to the invention has proven itself quite economical. Not only can a single centered support be provided, but both sides can be provided with armrests when suitably formed to provide for a bearing structure for the other joint bolts. Thus such passenger seats can be fastened on their left or their right side to the side walls of a vehicle. This, together with the single supporting column, provides for easy installation and removal.

Finally, the ease of fabrication of this passenger seat according to the invention should be emphasized. The entire design uses for its essential parts only rectangular tube sections, which can be assembled by automatic manufacturing equipment. Expensive bending machines and bending processes are not necessary for the production of this passenger seat. Thus the passenger seat according to the invention, as a whole, is exceptionally inexpensive.

SHORT DESCRIPTION OF THE DRAWINGS

The drawings schematically show an example of the passenger seat according to the invention.

DESCRIPTION OF THE PREFERRED EMBODIMENT

Figure 1:
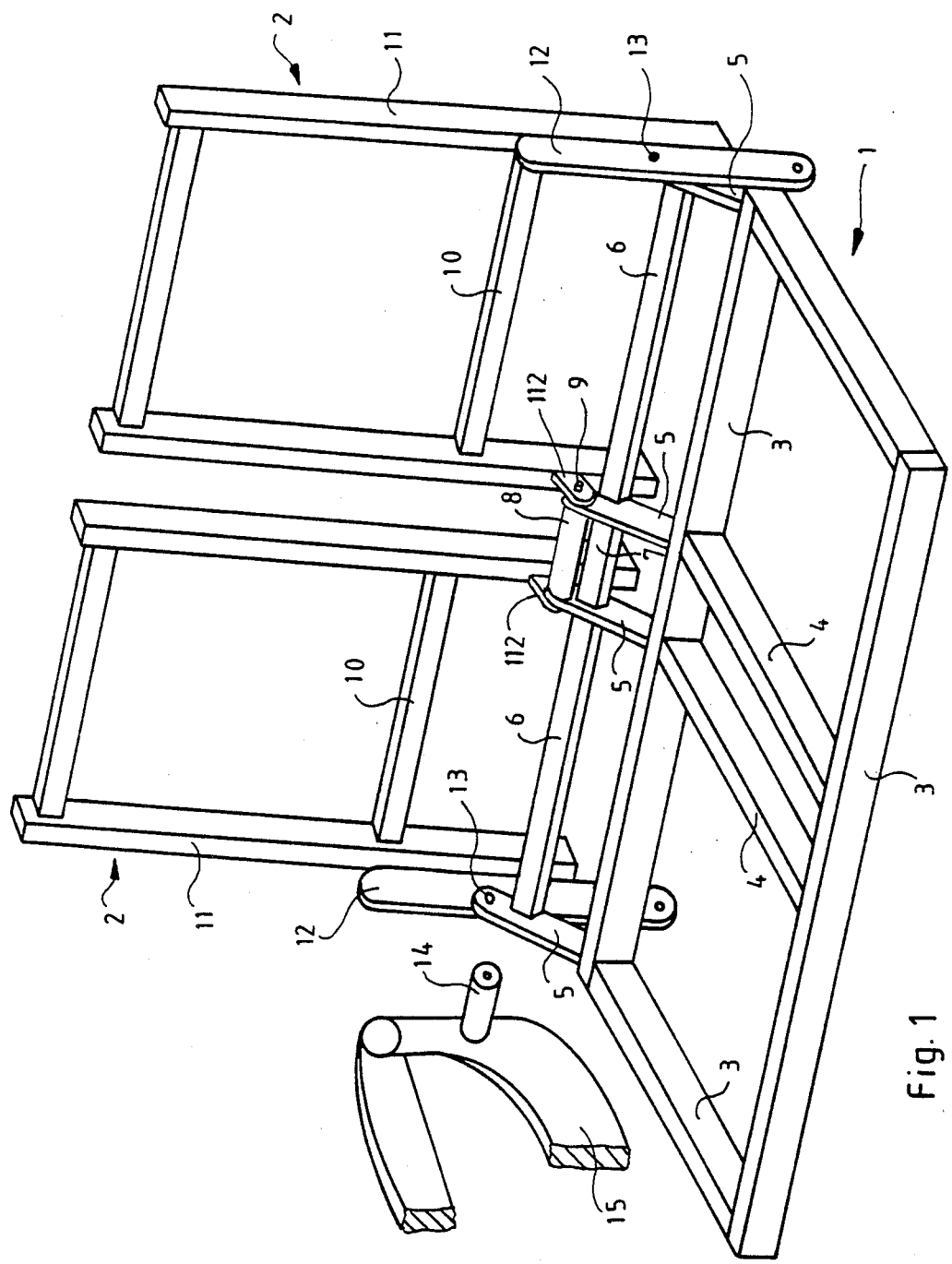
FIG. 1 shows the frame structure of the passenger seat in perspective.

The passenger seat according to the invention consists essentially of a seat frame 1 to which seat backs 2 are linked. The seat frame 1 is formed by rectangular tubes disposed with their narrow sides at top and bottom and interconnected to form a rectangular frame 3. This rectangular frame 3 is reinforced by crossover tubes 4 disposed at the center of the frame 3. Attached to the rear frame tube of the rectangular frame 3 at an upward angle of 45° are joint supports 5, which are connected with each other by means of stiffening rods 6. These joint supports 5 are further connected through a cross member 7 interconnecting the inner joint supports 5 as well as through an internally threaded crossbar 8 into which the inner joints bolts 9 can be screwed. The rear frame tube of the rectangular frame 3 together with the joint supports 5 and their stiffening rods 6, together with the crosspiece 7 and also the crossbar 8, form a supportive beam, which, through its special arrangement, is capable of taking up forces acting on the passenger seat in the plane of the rectangular frame 3 as well as forces acting perpendicularly thereto. This beam is additionally strengthened by reinforcement tubes 10 which are mounted into the rectangular frames 11 that form the seat backs 2. The drawing shows these reinforcement tubes 10 situated approximately at the extension of the line formed by the joint supports 5. However, they can also be situated at the ends of the rectangular tubes which form the rectangular frame 11. In order to obtain the necessary spacing between the reinforcement tubes 10 and stiffening rods 6, lugs 112 and stiffening lug members 12 are provided projecting from the rectangular frames 11, the lug members 12 extending along the frame 11 for a given length, thereby providing additional stiffening of the rectangular frame 11 adjacent the outer pivot joints 13. In addition, the extended lug members 12 can also serve to actuate a pneumatic spring (not shown).

The drawing also makes apparent that the fastening members 14 for the outer joint 13 may simultaneously serve for an armrest support 15.

Figure 2:
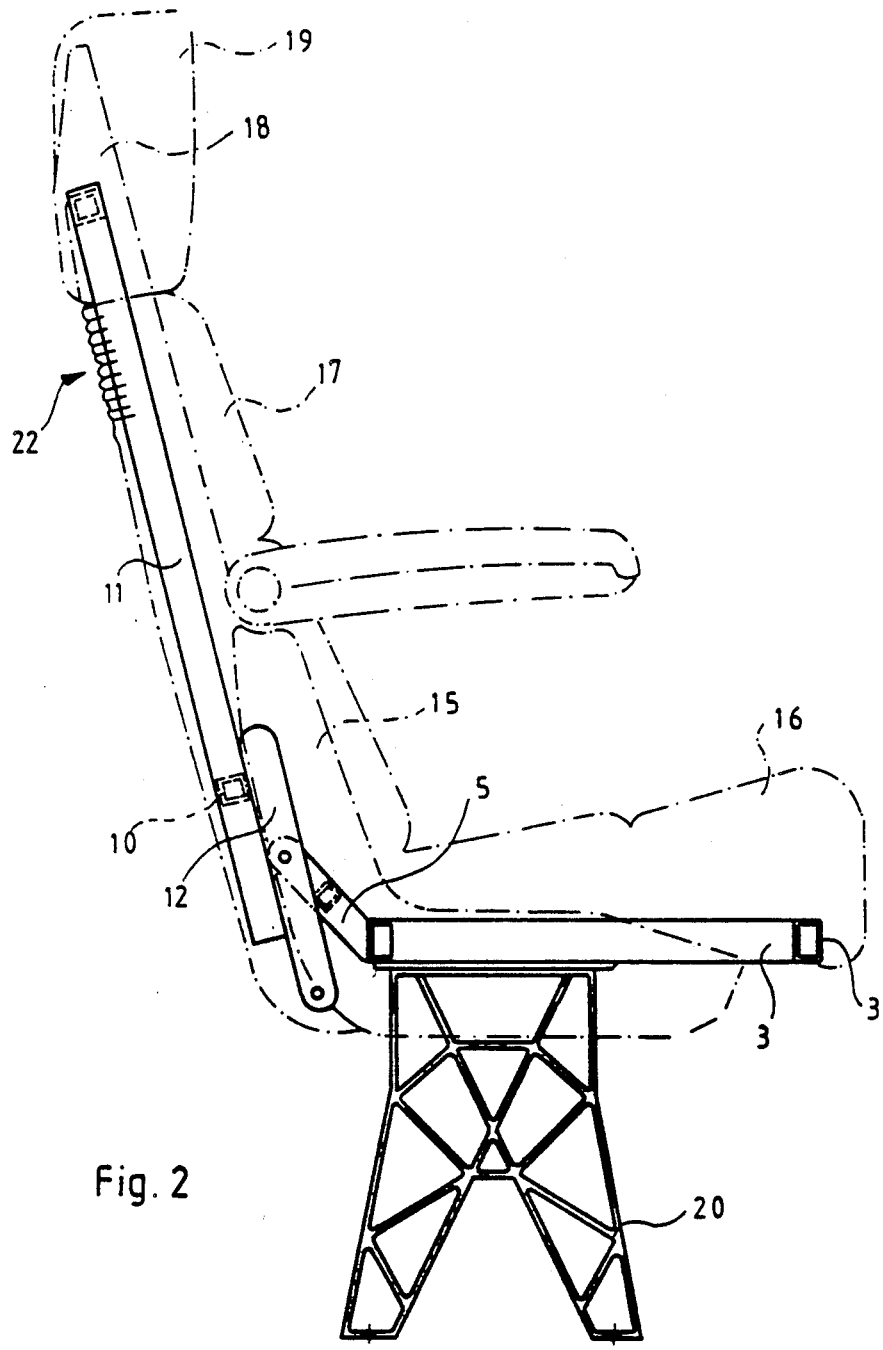
FIG. 2 is a side view of the passenger seat.
Figure 3:
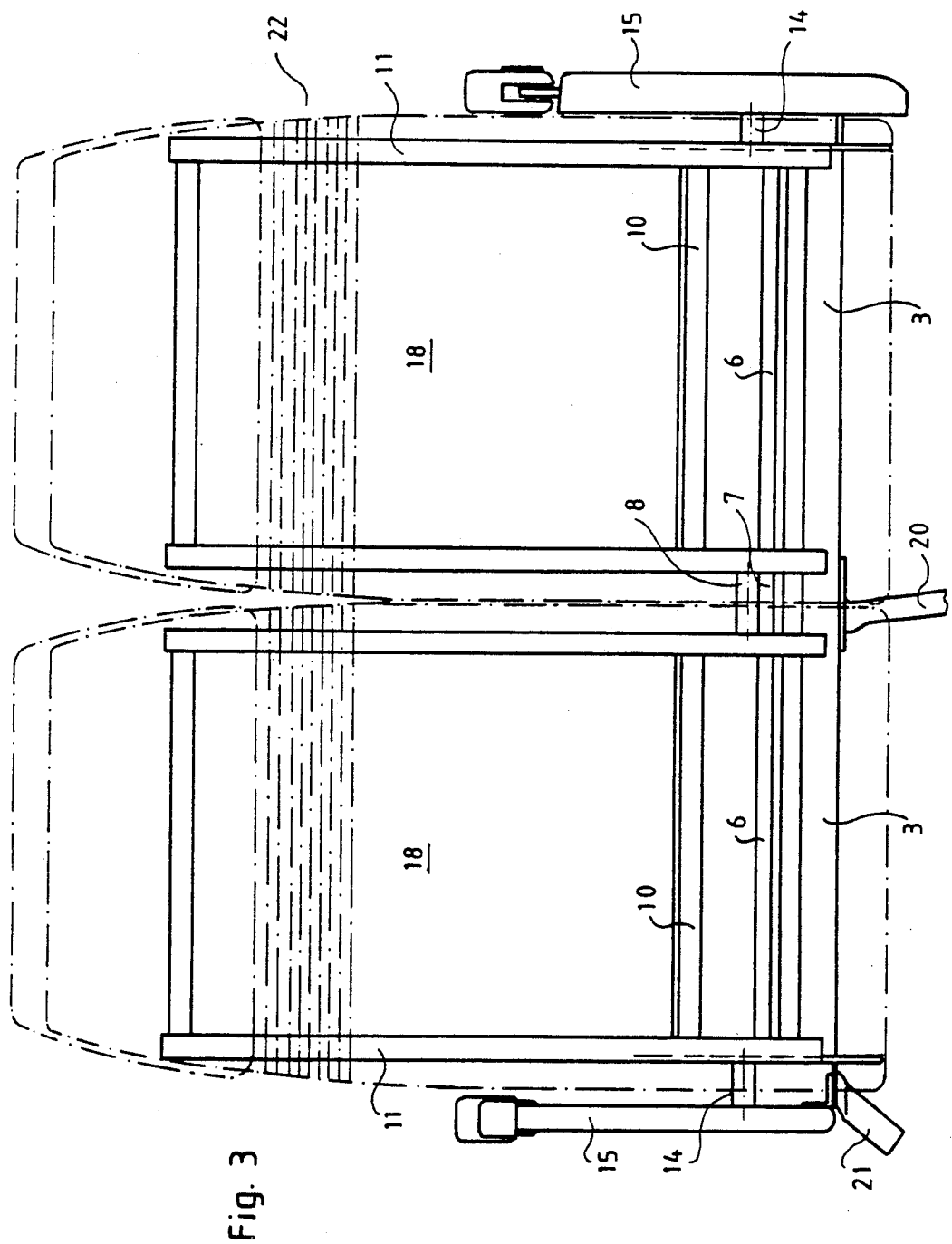
FIG. 3 is a rear view of the passenger seat.

FIGS. 2 and 3 show additionally by dash-dot lines the cushions 16 of the seat frame 1 as well as the cushions 17 of the seat backs 2; as shown in FIGS. 2 and 3, a convex plastic shell 18 extends above the top of the seat back 2 so that a headrest 19 can be mounted thereon. A support structure 20 of truss construction is attached to the cross tubes 4 at the bottom of the rectangular frame 3. A side projection 21 allows lateral attachment of the passenger seat and can be bolted to the side of the passenger seat adjacent the wall of the vehicle.

I claim:

1. A two-abreast passenger seat for vehicles, said seat comprising a rectangular seat frame constructed of front and rear tubes of rectangular cross-section and joined together by cross-tubes such that their narrower sides are at top and bottom, seat backs pivotally linked to said seat frame and also consisting of rectangular frame structures with cushion overlays, said rectangular seat frame having a rear frame tube and outer and inner joint supports attached to its rear frame tube such that said joint supports are angled upwardly at approximately 45° with respect to a plane defined by the frame with reinforcement tubes laterally extending between them approximately at the top end of the joint supports and an internally threaded cross-bar connected between said inner joint supports, said seat back frame structures including side and center frame members and having forwardly projecting stiffening lug members mounted to the side frame members at their lower forward end thereof and forwardly projecting lugs mounted to the center frame members with said stiffening members and said forwardly projecting lugs being pivotally supported on said upwardly angled joint supports.

2. A passenger seat according to claim 1, wherein the inner joint supports are firmly connected with one another through a crosspiece.

3. A passenger seat according to claim 1, wherein the rectangular seat back frame is constructed of rectangular tubes disposed with their wider sides facing each other, the rear of the seat back being covered by a plastic shell having stiffening corrugations and enclosing the rectangular seat back frame, and said plastic shell extending above the top of the rectangular frame.

4. A passenger seat according to claim 1, wherein a supporting truss structure is attached to the rectangular frame at the cross tubes extending across the seat frame between the two seat locations.

5. A passenger seat according to claim 1, wherein the outer joint supports include fastening members which have armrest supports attached thereto.

* * * * *